(12) United States Patent
Evans et al.

(10) Patent No.: US 7,453,035 B1
(45) Date of Patent: Nov. 18, 2008

(54) METHODS AND SYSTEMS FOR PROVIDING MUSICAL INTERFACES

(75) Inventors: Matt Evans, San Francisco, CA (US); Timothy E. Wasko, High River (CA)

(73) Assignee: Apple Inc., Cupertino, CA (US)

( * ) Notice: Subject to any disclaimer, the term of this patent is extended or adjusted under 35 U.S.C. 154(b) by 115 days.

(21) Appl. No.: 11/033,428

(22) Filed: Jan. 7, 2005

(51) Int. Cl.
G09B 15/00 (2006.01)
G09B 15/02 (2006.01)
G10H 1/00 (2006.01)

(52) U.S. Cl. ............... 84/477 R; 84/478; 84/609; 84/613

(58) Field of Classification Search .......... 84/477 R, 84/478
See application file for complete search history.

(56) References Cited

U.S. PATENT DOCUMENTS

| | | | |
|---|---|---|---|
| 5,886,273 A * | 3/1999 | Haruyama | 84/478 |
| 6,160,213 A * | 12/2000 | Arnold et al. | 84/615 |
| 6,201,174 B1 * | 3/2001 | Eller | 84/477 R |
| 6,204,441 B1 * | 3/2001 | Asahi et al. | 84/470 R |
| 6,388,181 B2 * | 5/2002 | Moe | 84/477 R |
| 6,740,802 B1 * | 5/2004 | Browne, Jr. | 84/609 |
| 6,915,488 B2 * | 7/2005 | Omori et al. | 715/773 |
| 6,972,363 B2 * | 12/2005 | Georges et al. | 84/609 |
| 6,982,375 B2 * | 1/2006 | McGregor | 84/478 |
| 6,995,310 B1 * | 2/2006 | Knapp et al. | 84/722 |
| 7,019,204 B2 * | 3/2006 | Terada | 844/601 |
| 2001/0029829 A1 * | 10/2001 | Moe | 84/478 |
| 2002/0026865 A1 * | 3/2002 | Akahori | 84/478 |
| 2004/0244564 A1 * | 12/2004 | McGregor | 84/478 |

* cited by examiner

Primary Examiner—Marlon T Fletcher
(74) Attorney, Agent, or Firm—Blakely, Sokoloff, Taylor & Zafman LLP

(57) ABSTRACT

An exemplary embodiment of a method of selecting a portion of an input of a musical instrument within a display window in a graphical user interface for staff-based musical notation and a computer readable medium containing a program code for selecting the portion are summarized here. An octave picker on the input of the musical instrument is displayed within the display window. The octave picker is moved to a desired portion on the input of the musical instrument. An enlarged view of at least the desired portion of the input is displayed. For one embodiment, the octave picker is moved after receiving selection of the desired portion on the input of the musical instrument. For another embodiment, the octave picker is moved to the desired portion after receiving selection and a user manipulation of the octave picker. The octave picker is displayed over the desired portion on the input.

12 Claims, 17 Drawing Sheets

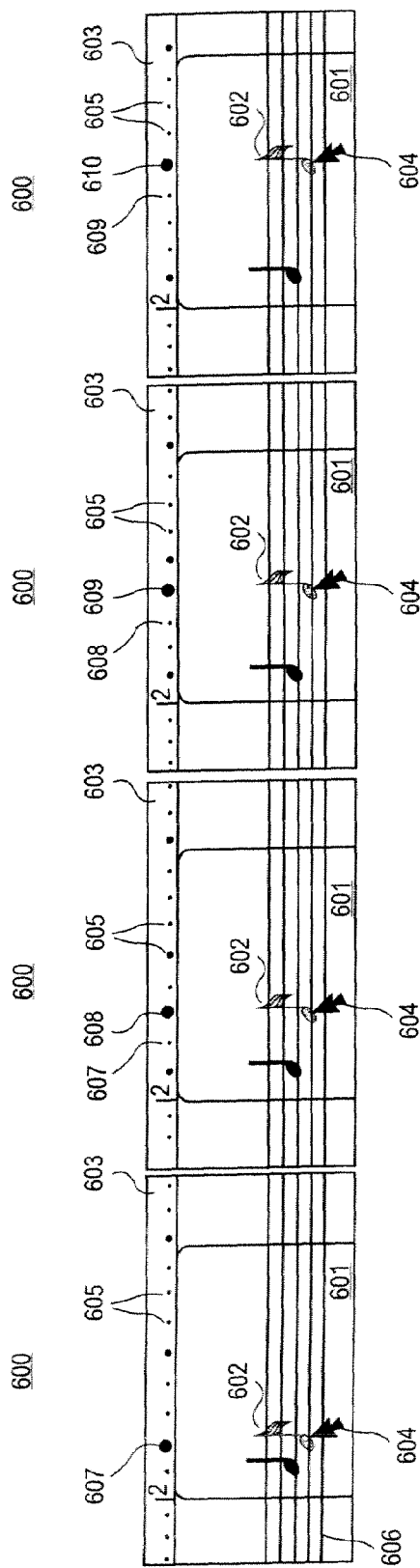

METHODS AND SYSTEMS FOR PROVIDING MUSICAL INTERFACES

FIELD

Embodiments of the invention relate to a graphical user interface ("GUI"). More particularly, embodiments of the invention relate to methods of manipulating notes in graphical user interfaces for staff-based musical notation.

BACKGROUND

Present technologies to create, manipulate, and process various signals involve a number of independent systems communicating with each other. An interface is a boundary across which the independent systems meet and act on or communicate with each other. A user interface includes a keyboard, a mouse, menus of a computer system. The user interface provides the communication between the user and the operating system of the computer. A software interface includes languages and codes written into the computer system that various applications use to communicate with each other and the hardware. A hardware interface includes wires, plugs, and sockets hardware devices use to communicate with each other. A GUI is referred to a graphical user interface for the user to interact with the hardware and software to create, manipulate, or modify various signals using graphic icons and controls in addition to text. Typically, the GUI features the basic components, such as a pointer, a pointing device, icons, desktop, windows, and menus. The pointer usually appears on the display screen as an angled arrow, which the user moves to select objects or commands. The pointing device, such as a mouse or a trackball, enables the user to select objects on the display screen. The icons are small pictures that represent commands, files, or windows. By moving the pointer to the icon and pressing a mouse button, the user executes a command, converts the icon into the window, or moves the icon around the display screen. The desktop is the area on the display screen where icons are typically grouped. The user may divide the screen into different areas using the windows. In each window, the user may run a different program or display a different file. Most graphical user interfaces let the user to execute commands by selecting a choice from the menu.

With the increasing use of multimedia as part of the GUI, sound, voice, motion video, and virtual reality interfaces become a part of the GUI for many applications. For example, GarageBand (Trademark) produced by Apple Computer, Inc., uses sampled real musical instruments and synthesized instruments to create or edit a piece of music.

Current GUIs for musical notation, however, require complicated workflow, which involves numerous actions by the user, including many mouse clicks and travel, to perform a single operation. For example, to change a duration of a note on a musical staff, a user needs to actually replace the note with the note with a desired duration. To perform this, a user needs to open a menu located on the toolbar outside the staff area, select the note with the desired duration from the menu, bring the note having the desired duration to the staff area, and then replace the note on the staff with the note having the desired duration. For example, changing the duration of a pedal also involves many steps, including opening a menu with a palette, dragging a start sign for the pedal from the palette to a desired position in the notation window corresponding to the beginning of the pedal, then going back to the palette to pick up the end sign for the pedal, and dragging the end sign to the desired position on the notation window corresponding to the end of the pedal. Current graphical user interfaces ("GUIs") for musical notation also do not provide a direct manipulation of many features of the note, including control of the position of the note as it moves along the staff, changing a time duration of a note, changing a velocity of the note, and the like.

SUMMARY

Exemplary embodiments of methods and systems for providing musical interfaces are disclosed. Methods of selecting a portion of an input of a musical instrument within a display window in a graphical user interface for staff-based musical notation and a system having a computer readable medium containing a program code for selecting the portion of the input of the musical instrument are described below. Methods may simplify existing workflow so that it requires fewer mouse clicks and involves less mouse travel. First, an octave picker on the input of the musical instrument is displayed within the display window. The octave picker may extend over one or more octaves over a portion of the input of the musical instrument. Next, the octave picker is moved to a desired portion on the input of the musical instrument. Further, an enlarged view of at least the desired portion of the input of the musical instrument is displayed. For one embodiment, the octave picker is moved to the desired portion after receiving selection of the desired portion on the input of the musical instrument. For another embodiment, the octave picker is moved to the desired portion after receiving selection and a user manipulation of the octave picker. For an embodiment, the octave picker is displayed over the desired portion on the input of the musical instrument. For one embodiment, the octave picker highlights the portion of the input of the musical instrument to indicate, for example, the number of keys visible to the user.

BRIEF DESCRIPTION OF THE DRAWINGS

The present invention is illustrated by way of example and not limitation in the figures of the accompanying drawings in which like references indicate similar elements.

FIGS. 6A-6D illustrate a note at different positions along a beat ruler, which provides a beat guide for the note within a notation window according to one embodiment of the invention.

FIGS. 10A-10F illustrate a method to change duration of a pedal within a notation window according to another embodiment of the invention.

DETAILED DESCRIPTION

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well known or conventional details are not described in order to not unnecessarily obscure the present invention in detail.

Reference throughout the specification to "one embodiment", "another embodiment", or "an embodiment" means that a particular feature, structure, or characteristic described in connection with the embodiment is included in at least one embodiment of the present invention. Thus, the appearance of the phrases "for one embodiment" or "for an embodiment" in various places throughout the specification are not necessarily all referring to the same embodiment. Furthermore, the particular features, structures, or characteristics may be combined in any suitable manner in one or more embodiments.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2005.

Figure 1:
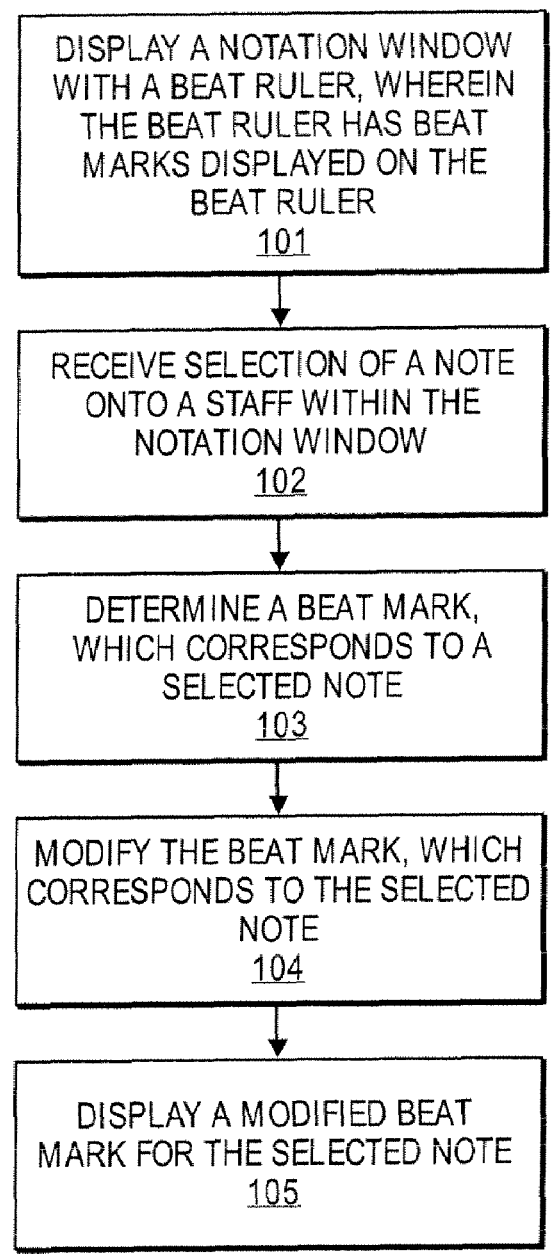
FIG. 1 is a flowchart of a method to guide a note along a beat ruler within a notation window according to one embodiment of the invention.

FIG. 1 is a flowchart of a method 100 to guide a note along a beat ruler within a notation window according to one embodiment of the invention. The method begins with displaying 101 a notation window with a beat ruler and a staff, wherein the beat ruler has beat indicators ("marks") displayed on the beat ruler.

Figure 2:
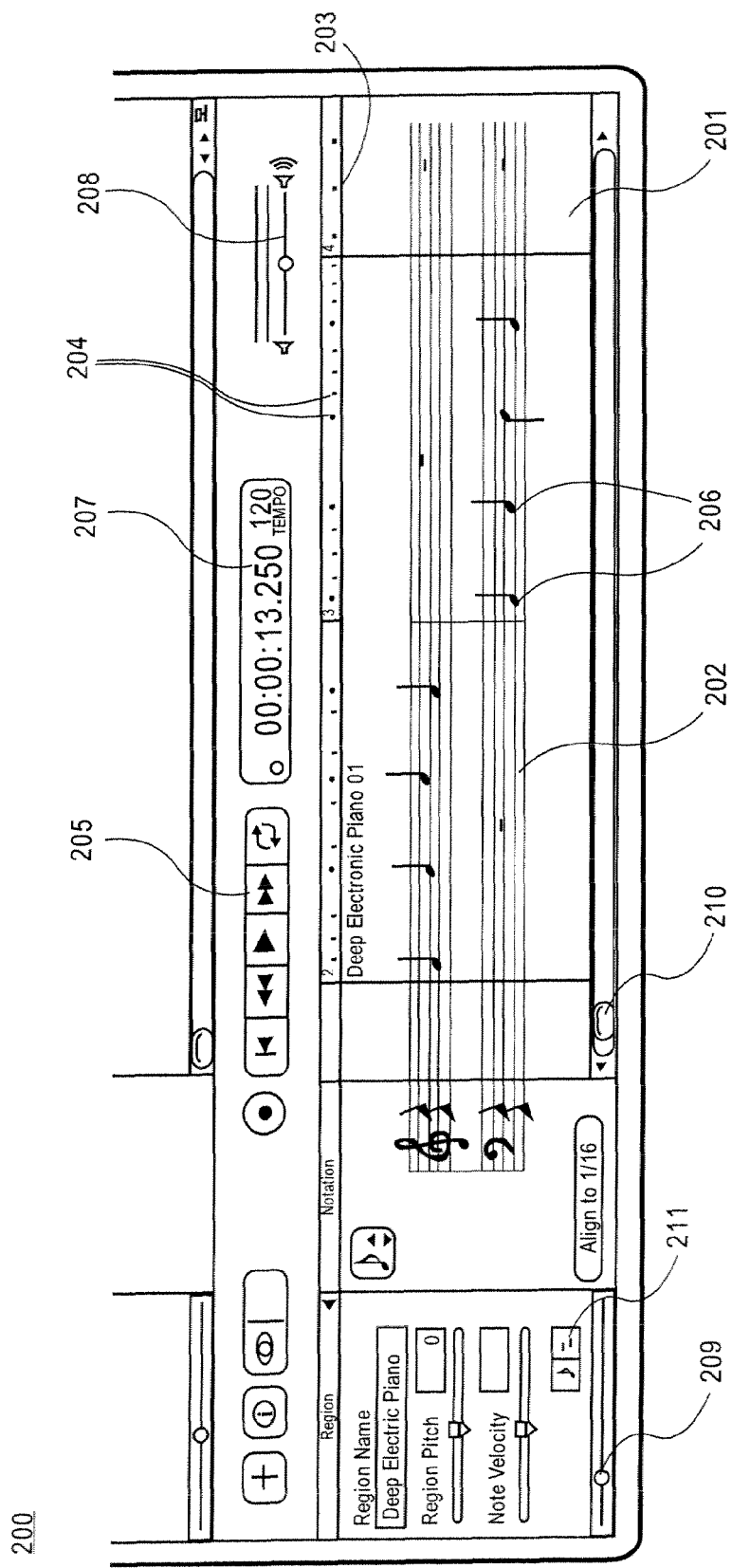
FIG. 2 shows a notation window in a graphical user interface according to one embodiment of the invention.

FIG. 2 shows a notation window 201 in a graphical user interface ("GUI") 200 according to one embodiment of the invention. As shown in FIG. 2, a staff 202 and a beat ruler 203 are displayed within the notation window 201. Time indicators 204 are displayed on the beat ruler 203. The time indicators 204 represent beats and measures, the units of musical time on the beat ruler 203. For one embodiment, one or more notes 206 are displayed on the staff 202 within the notation window 201. For one embodiment, the time indicators 204 are dynamic and shift automatically in response to note arrangements and placement on the staff 202. For one embodiment, the notation window 201 includes a scroll bar 210 to move to different parts of a score along the horizontal axis in a notation window 201. For another embodiment, the GUI 200 includes a zoom slider 209 to control the horizontal spacing between notes 206 within the notation window 201, as shown in FIG. 2. For one embodiment, the GUI 200 has transport controls 205 with buttons to record music, to start or stop music, to move to different parts of the musical piece, and to turn on a cycle region, as shown in FIG. 2. For one embodiment, the GUI 200 may include a time display 207, and a volume slider 208, as shown in FIG. 2. For an embodiment, a vertical size of the notation window 201 is determined automatically by the height of the score area, such that a user does not need to scroll to see a content of the notation window 201. For one embodiment, the GUI 200 displays a switcher 211 to toggle between the notation view ("notation window") and a piano roll view ("piano roll window") of the score.

Figure 3:
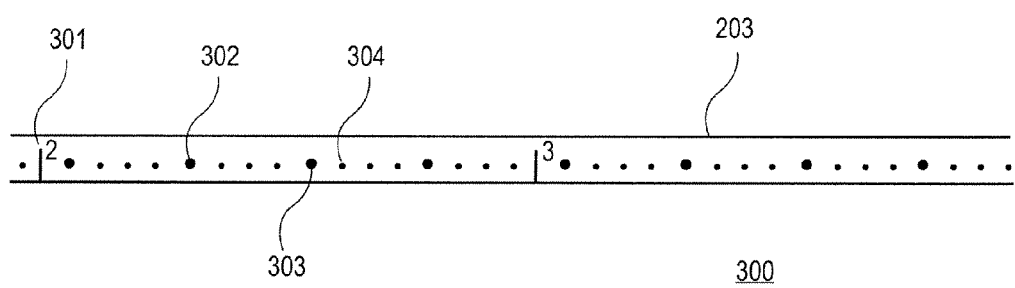
FIG. 3 is an enlarged view of a beat ruler according to one embodiment of the invention.

FIG. 3 is an enlarged view 300 of the beat ruler 203 having time indicators according to one embodiment of the invention. Measures 301 and beat marks 302 are displayed on the beat ruler 203, as shown in FIG. 3. For one embodiment, the beat marks 302 are displayed as light gray dots and measures are displayed as lines or tick marks. For one embodiment, the beat marks 302 have different sizes, wherein larger beat marks 303 are positioned equidistantly after a predetermined amount of smaller beat marks 304, for example, after every third smaller beat mark to indicate every fourth beat, as shown in FIG. 3.

Figure 4A:
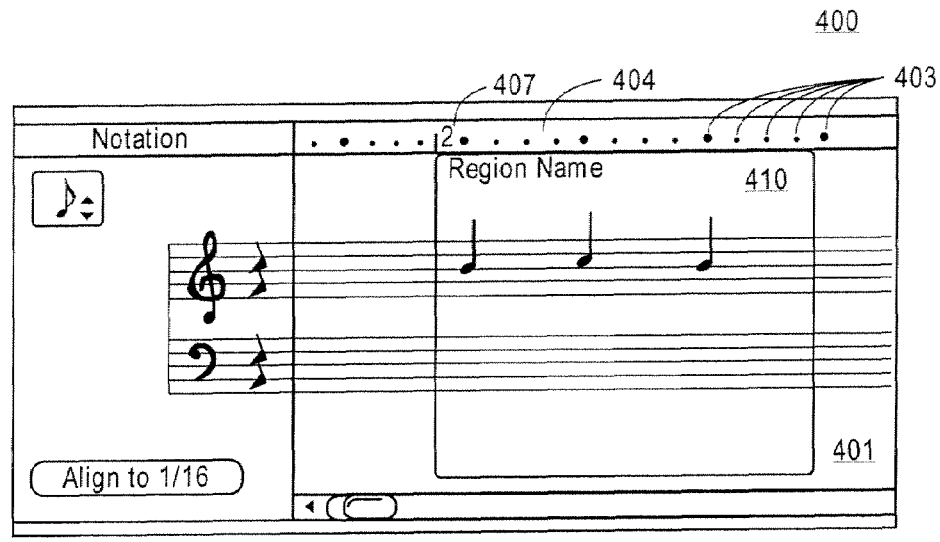
FIGS. 4A and 4B show a score editor in a notation window and in a piano roll window according to one embodiment of the invention.
Figure 4B:
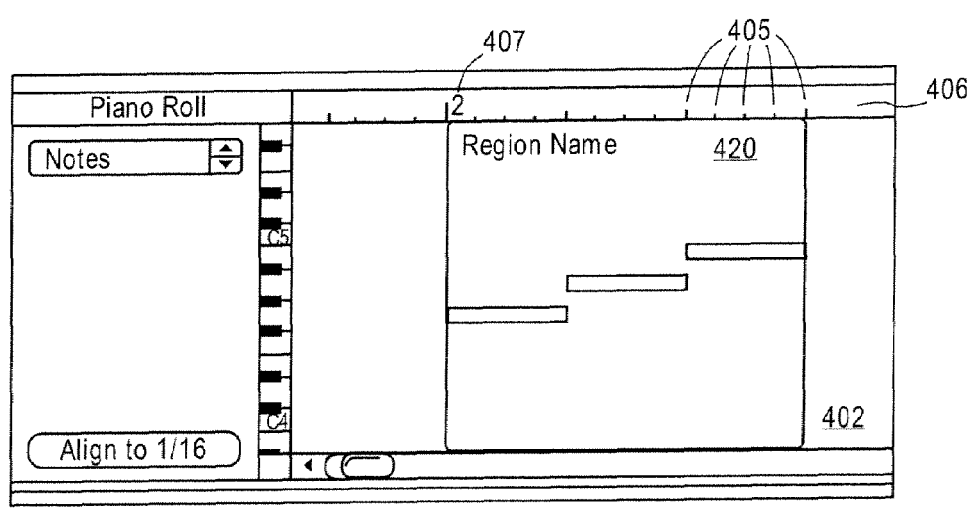

FIGS. 4A and 4B show a score system 400 in two views corresponding to a notation window 401 and a piano roll window 402 according to one embodiment of the invention. For an embodiment, a region 410 of the notation window 401 and a region 420 of the piano roll window 402 represent two aspects of the score system 400, wherein a piece of music may be encapsulated. As shown in FIGS. 4A and 4B, the time indicators 403 on the beat ruler 404 of the notation window 401 are consistent with the time indicators 405 of the beat ruler 406 of the piano roll window 402, because regions in both windows are tied to the length of measures and the beats within each measure. As shown in FIG. 4, numbers of the measures 407 appear in the beat ruler 404 and in the beat ruler 406 in both windows 401 and 402 that reinforces the connection between the two views.

Referring back to FIG. 1, the method continues with the operation 102 of receiving a selection of the note onto the staff within the notation window. For one embodiment, the note may be selected by the user from a menu containing various notes and placed on a desired position onto the staff. The placement may involve a drag and drop operation using a mouse. For example, a user may position a cursor over a note on the display, using a mouse of or other cursor control device, drag the note onto the staff and horizontally along the staff. Next, at operation 103 a beat mark, which corresponds to a selected note, is determined. For one embodiment, the beat mark corresponding to the selected note is the beat mark, which is positioned on the beat ruler at a shortest distance to the selected note. Next, at operation 104 the beat mark, which corresponds to the selected note, is modified. For one embodiment, modifying the beat mark, which corresponds to the selected note, includes changing a size of the beat mark. Further, at operation 105, the modified beat mark is displayed. For one embodiment, the selected note may change position on the staff along the beat ruler in response to an input from a user. In this case, the determining 103 the beat mark, the modifying 104 of the beat mark, and the displaying 105 the modified beat mark is continuously repeated while the position of the selected note is changed (e.g. as the user drags the note horizontally along the staff). As a result, the selected note is guided along the staff as the position of the note along the beat ruler changes.

Figure 5A:
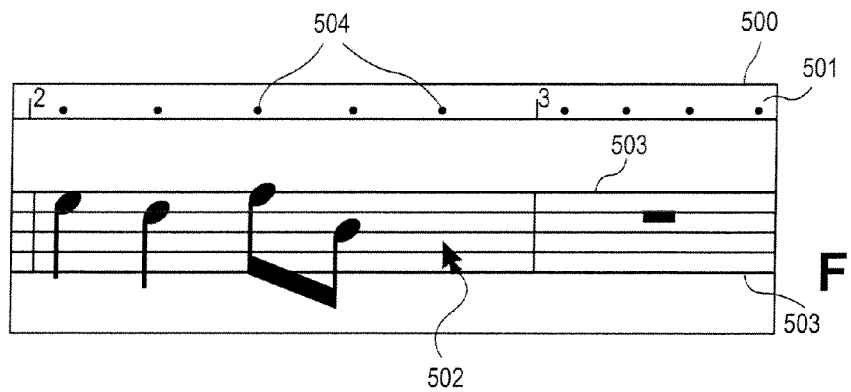
FIG. 5A illustrates a notation window, wherein a cursor is positioned over a desired location on a staff to place a note according to one embodiment of the invention.

FIG. 5A illustrates a notation window 500 having a beat ruler 501, wherein a cursor 502 is positioned over a desired location on the staff 503 to place a note according to one embodiment of the invention. As shown in FIG. 5A, beat marks 504 are displayed on the beat ruler 501. The beat marks 504 are displayed as dots of a predetermined size on the beat ruler 501.

Figure 5B:
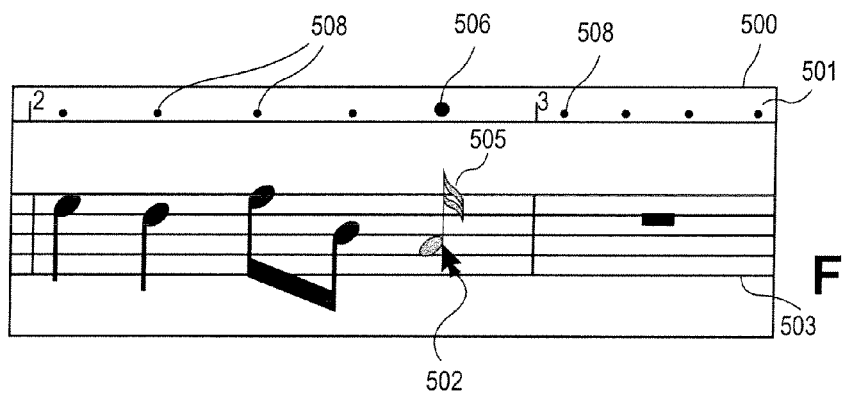
FIG. 5B illustrates the notation window of FIG. 5A, after selecting the note and placing the note onto a desired position on the staff.

FIG. 5B illustrates the notation window 500 having the beat ruler 501, after selecting a note 505 and placing the note 505 onto a desired position on the staff 503 according to one embodiment of the invention. For one embodiment, the note 505 may be selected from a menu having various notes by clicking on the note 505 in the menu and then dragging the note 505 with a cursor 502 using a mouse, to the desired location onto the staff 503. For another embodiment, the note 505 may be activated from a pop-up menu at the desired position on the staff 503 by a click of a mouse (e.g. the user positions a cursor, using a mouse, at the desired position, and then presses the mouse's button or otherwise causes a signal to request the pop-up menu) and then placed onto the staff 503 by pressing a single key on a keyboard. For one embodiment, the single key on the keyboard is a COMMAND key, or a CONTROL key, or a combination thereof. As shown in FIG. 5B, the beat mark 506, which is positioned at the shortest distance to the selected note 505, is determined. Further, the beat mark 506 is modified, such that the appearance of the beat mark 506 is changed relative to the original appearance and the appearance of the rest of the beat marks 508. For one embodiment, when the single key is pressed on the keyboard, the beat mark 506 is enlarged, and the selected note 505 is displayed as a ghosted note, as shown in FIG. 5B. For one embodiment, the beat mark 506 is enlarged, when the COMMAND key is pressed on the keyboard.

Figure 5C:
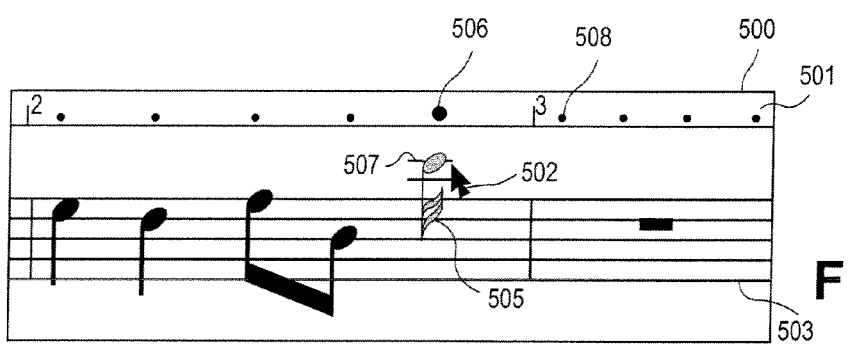
FIG. 5C illustrates the notation window of FIG. 5B, after moving the note beyond the staff in a vertical direction according to another embodiment of the invention.

FIG. 5C illustrates the notation window 500 having the beat ruler 501, after moving the note 505 beyond the staff 503 along a vertical direction with the cursor 502 according to another embodiment of the invention. As shown in FIG. 5C leger lines 507 automatically appear at a head of the note 505 to indicate a pitch of the note. The beat mark 506, which is closest to the note 505 in a horizontal direction along the beat ruler 501, appears as an enlarged dot on the beat ruler 501 to indicate a position of the note 505 in a time domain, as shown in FIG. 5C. For one embodiment, the leger lines 507 appear on the head of the note 505, when the note is moved with the cursor 502 in the vertical direction, while the mouse is pressed and the COMMAND key is pressed on the keyboard. For one embodiment, the note 505 snaps horizontally to a position, which is aligned to the modified beat mark 506, when the mouse is released.

FIGS. 6A-6D illustrate a note 602 at different positions along a beat ruler 603, which provides a beat guide ("placement guide") for the note 602 within a notation window 601 according to one embodiment of the invention. A note 602 selected by a user with a cursor 604 is displayed as a ghosted note, as shown in FIG. 6A. For one embodiment, the beat ruler 603 has beat marks 605, wherein every fourth beat mark has a larger size relative to the other beat marks, as shown in FIG. 6A. The beat guide provided by the beat ruler 603 appears as an enlarged version of one of the beat marks 605 in the beat ruler 603 as the note 602 moves along the beat ruler 603 in the horizontal direction. The beat guide indicates the position in time domain on the staff 606 along the beat ruler 603, where the note 602 is to be placed. For one embodiment, the beat guide along the beat ruler 603 appears when a key on the keyboard is pressed. More specifically, the key on the keyboard to show the beat guide along the beat ruler 603 may be a COMMAND key, a CONTROL key, or a combination thereof.

After the note 602 having a first position on the staff 606 is selected, the beat mark 607, which is closest to the selected note 602, is determined. Further, the beat mark 607 is modified to be displayed having an appearance, which is different from its original appearance and the appearance of the other beat marks on the beat ruler 603, as shown in FIG. 6A. For one embodiment, the modified beat mark 607 appears as an enlarged dot, which has a color, which is different from the other beat marks on the beat ruler 603, as shown in FIG. 6A.

FIG. 6B illustrates the notation window 601, after the note 602 is moved along the beat ruler 603 in a horizontal direction to a second position. The beat mark 608, which is closest to the second position of the note 602, is determined. The beat mark 608 is modified to be displayed having a different appearance relative to the original appearance, as shown in FIG. 6B. The beat mark 607 corresponding to the first position of the note 602, is returned back to its original appearance, as shown in FIG. 6B. For one embodiment, the beat mark 608 is displayed as an enlarged dot with modified color (or the same color), while the beat mark 607 is displayed back to its original size and color. For one embodiment, the note 602 is moved over the staff 606 by dragging the note 602 with the cursor 604 and dynamically as the note 602 is dragged, the closest beat mark changes its appearance.

FIG. 6C illustrates the notation window 601, after the note 602 is moved along the beat ruler 603 in a horizontal direction to a third position. The beat mark 609, which is closest to the third position of the note 602, is determined. The beat mark 609 is modified to be displayed having a different appearance relative to the original appearance, as shown in FIG. 6C. The beat mark 608 corresponding to the second position of the note 602 is returned back to its original appearance, as shown in FIG. 6C. For one embodiment, the beat mark 609 is displayed as an enlarged dot with a modified color (or the same color), while the beat mark 608 is displayed back to its original size and color, as shown in FIG. 6C.

FIG. 6D illustrates the notation window 601, after the note 602 is moved along the beat ruler 603 in a horizontal direction to a fourth position. The beat mark 610, which is closest to the fourth position of the note 602, is determined. The beat mark 610 is modified to be displayed having different appearance relative to the original appearance, as shown in FIG. 6D. The beat mark 609 corresponding to the third position of the note 602 is returned back to its original appearance, as shown in FIG. 6D. For one embodiment, the beat mark 610 is displayed as an enlarged dot with a modified color, while the beat mark 609 is displayed back to its original size and color, as shown in FIG. 6D. For an embodiment, the note 602 is snapped into a position ("a legal drop point") aligned vertically to the modified beat mark 610, when the note 602 passes over such position, as shown in FIG. 6D.

Figures 7A, 7B, 7C:
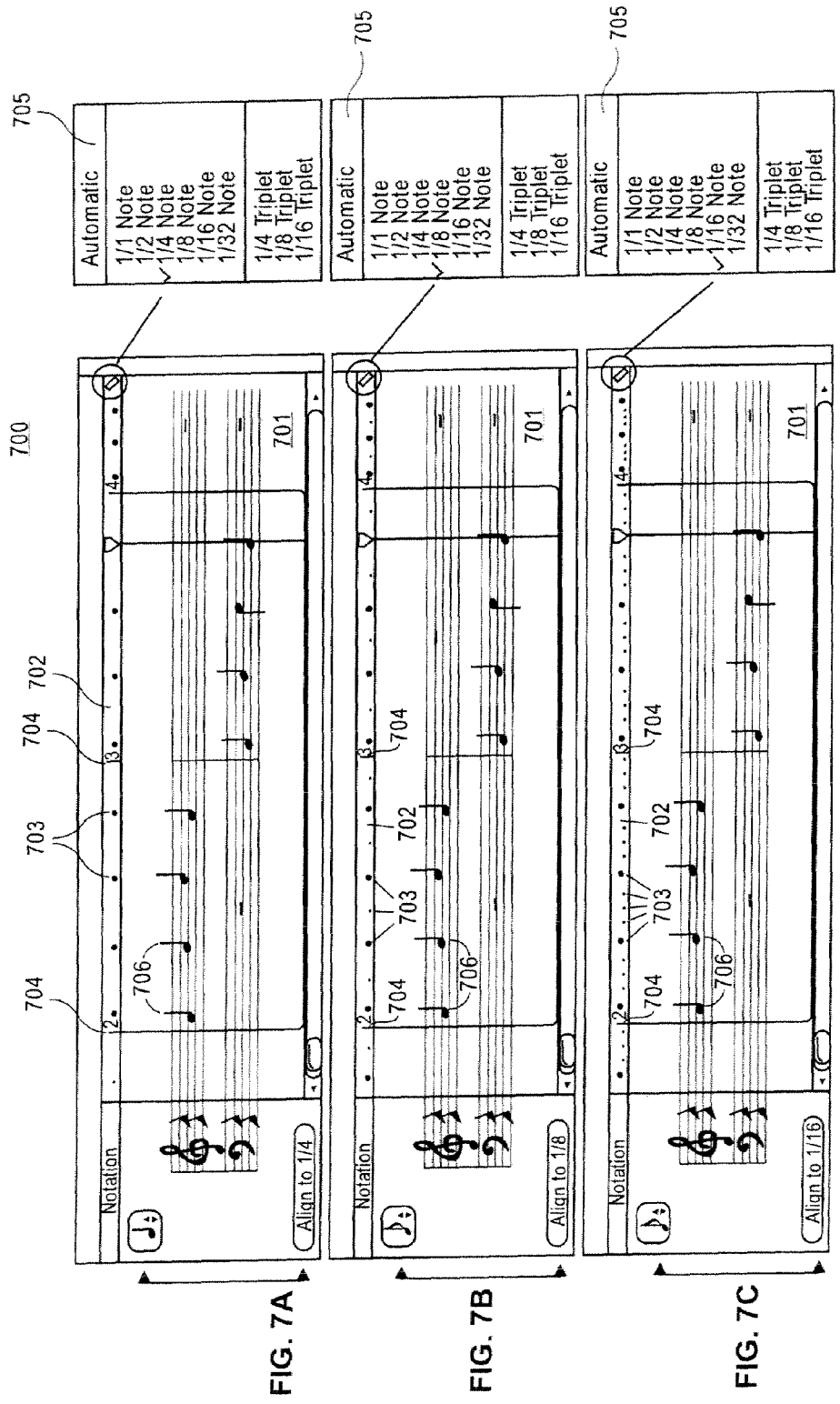
FIGS. 7A-7C illustrate a notation window at various resolutions of a grid on a beat ruler according to another embodiment of the invention.

FIGS. 7A-7C illustrate the notation window 701 at various resolutions of a grid on a beat ruler 702 according to another embodiment of the invention. The resolution of the grid on the beat ruler 702 may be changed by changing an amount of beat marks 703 and changing a distance between each of the beat marks 703 within measure marks 704, as shown in FIGS. 7A-7C. For an embodiment, an amount of legal drop points, wherein the notes 706 may be snapped, as described with respect to FIGS. 5 and 6, may be changed respectively by changing the resolution of the grid, as shown in FIGS. 7A-7C.

FIG. 7A illustrates the notation window 701, wherein the beat ruler 702 has four beats per measure. Four beat marks 703 are positioned within each pair of measure marks 704, as shown in FIG. 7A, meaning that each of the notes 706 has four legal drop points within the measure. For one embodiment, the resolution of the grid on the beat ruler 702 may be changed by opening a pop-up menu 705 and selecting a desired resolution, as shown in FIG. 7A.

FIG. 7B illustrates the notation window 701, wherein the resolution of the grid of the beat ruler 702 is increased by a factor of two relative to the resolution illustrated in FIG. 7A. As shown in FIG. 7B, eight beat marks 703 are placed within each pair of measure marks 704 and the distance between each of the beat marks 703 is decreased by a factor of two. Accordingly, the amount of the legal drop points for each of the notes 706 is increased by a factor of two, as shown in FIG. 7B.

FIG. 7C illustrates the notation window 701, wherein the resolution of the grid of the beat ruler 702 is increased by a factor of four relative to the resolution illustrated in FIG. 7A. As shown in FIG. 7C, sixteen beat marks 703 are placed within each pair of measure marks 704 and the distance between each of the beat marks 703 is decreased by a factor of four. The amount of legal drop points for each of the notes 706 is increased by a factor of four accordingly with the increased resolution of the grid.

Figure 8:
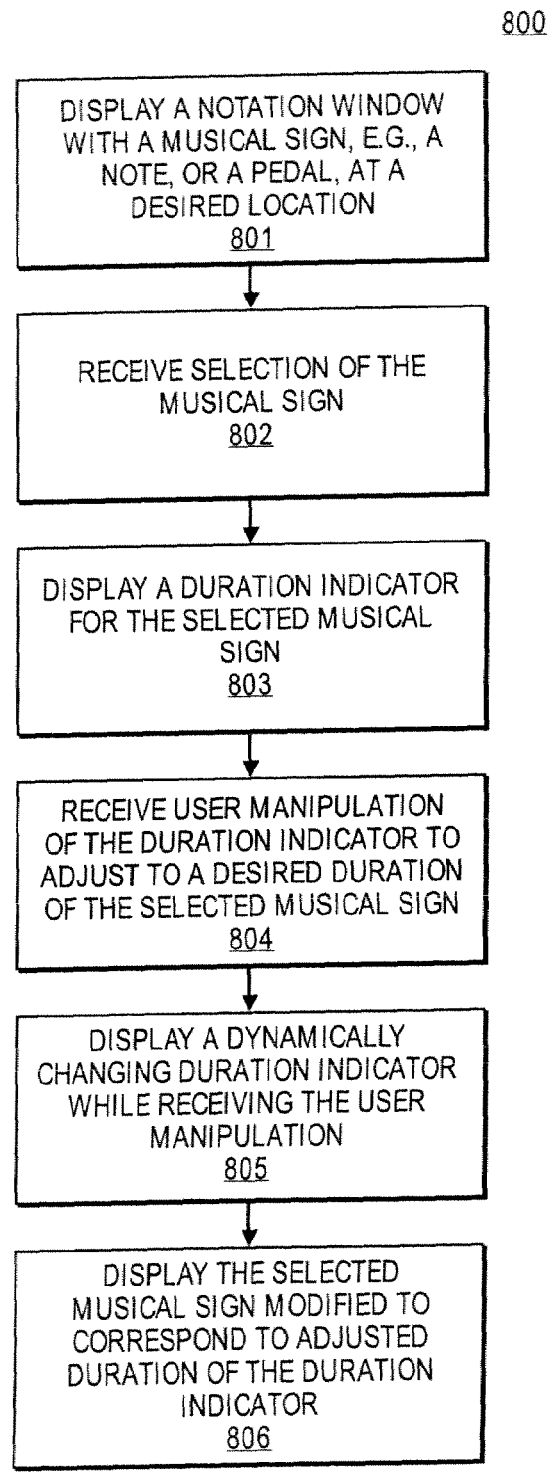
FIG. 8 is a flowchart of a method to change duration of a musical sign within a notation window according to one embodiment of the invention.

FIG. 8 is a flowchart of a method 800 to change duration of a musical sign, such as a musical note or a pedal sign, within a notation window according to one embodiment of the invention. The duration of the musical sign determines how long a sound represented by the musical sign lasts, measured in beats. The method 800 begins with displaying 801 a notation window with at least one musical sign at a desired location in the notation window as described above with respect to FIG. 2. The method 800 continues with the operation 802 of receiving a selection of the musical sign to change a time duration. Next, at operation 803 a duration indicator at the selected musical sign is displayed upon selecting of the musical sign. For an embodiment, the musical sign may be a note, a sign representing a pedal, or any other musical sign. For one embodiment, the duration indicator is displayed attached to or immediately adjacent a head of a note, when the note is selected ("activated") by positioning a cursor over a head of the note and pressing ("clicking") a mouse once. The duration indicator may alternatively be displayed above or below the note which is selected.

Figure 9A:
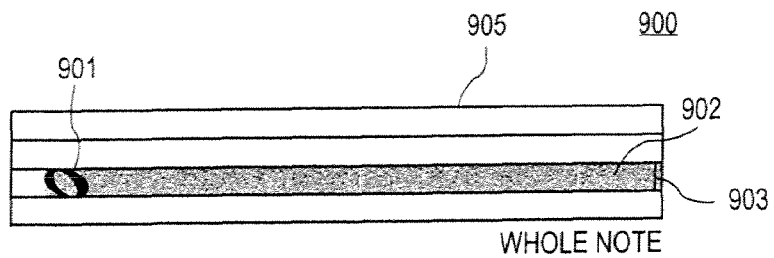
FIGS. 9A-9E illustrate notes of various durations with the duration indicators according to one embodiment of the invention.

FIGS. 9A-9D illustrate notes of various durations with the duration indicators according to one embodiment of the invention. FIG. 9A illustrates a whole note 901 on a staff 905 having a duration indicator appearing as a horizontal bar ("duration bar") 902 attached to a head of the selected note 901. The duration bar 902 has an adjustable length to adjust to the duration of the selected note. For example, the length of the duration bar 902 shown in FIG. 9A corresponds to the duration of the whole note 901. For one embodiment, the length of the duration bar 902 may be adjusted by positioning a cursor 906 over the handle 903 of the duration bar 902, clicking a button, such as a mouse's button, and dragging the handle 903 with a mouse into a direction, which corresponds to a desired duration. For an embodiment, the duration bar 902 has a minimum length of about six pixels to the right of the head of the note 901, such that substantially short notes may be changed. For an embodiment, the duration bar 902 has a subtle transparency, such that staff 905 and other notes are visible through the duration bar 902. For an embodiment, the duration bar 902 has a height about the same as the height of the head of the note 901.

Referring back to FIG. 8, the method 800 continues with operation 804 of receiving a user manipulation of the duration indicator to adjust to a desired duration of the selected musical sign. Next, displaying 805 a dynamically changing duration indicator is performed while receiving the user manipulation. This user manipulation may be a direct manipulation of the duration indicator by using a cursor to drag the indicator to either length it or shorten it. Alternatively, once the indicator has been presented, other manipulation such as the use of the left and right arrow keys may also be used to change the length of the indicator and hence the duration of the selected note. The modified duration indicator corresponds to the desired duration of the note. Next, displaying 806 of the selected musical sign modified to correspond to the adjusted duration of the duration indicator is performed.

Figure 9B:
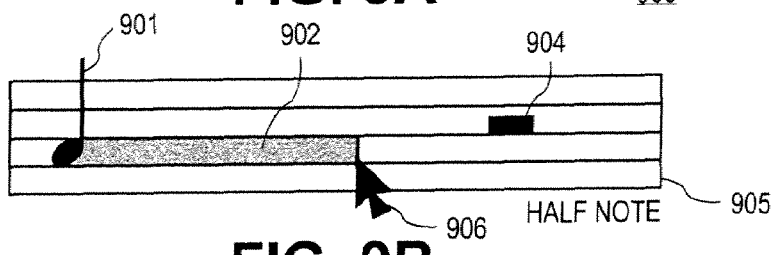

FIG. 9B illustrates the note 901 with the duration bar 902 having a length adjusted to a desired duration, which corresponds to a half note. The appearance of the note 901 is automatically modified to the half note to reflect the adjusted duration bar 902, as shown in FIG. 9B wherein the adjustment by the user of the bar 902 caused the system to automatically change the note to a half note. For one embodiment, rests 904 are automatically added or removed by the system from the staff 905, as a length of the duration bar 902 is reduced or increased. FIG. 9B illustrates one of the rests 904, which corresponds to the half note, added to the staff 905.

Figure 9C:
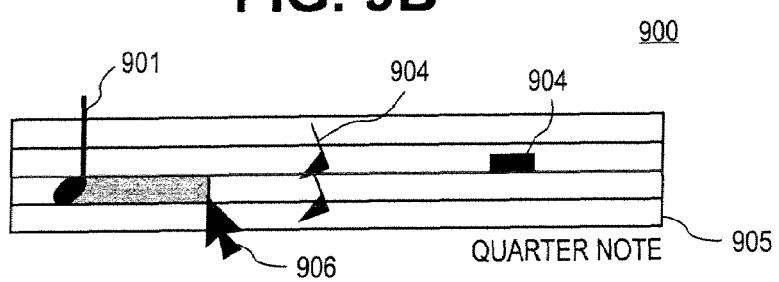

FIG. 9C illustrates the note 901 with the duration bar 902 adjusted to a quarter note. The appearance of the note 901 is automatically modified by the system to the quarter note in response to the user's adjustment of duration bar 902, as shown in FIG. 9C. Rests 904 corresponding to three quarter notes are respectively automatically added to the staff 905, as shown in FIG. 9C.

Figure 9D:
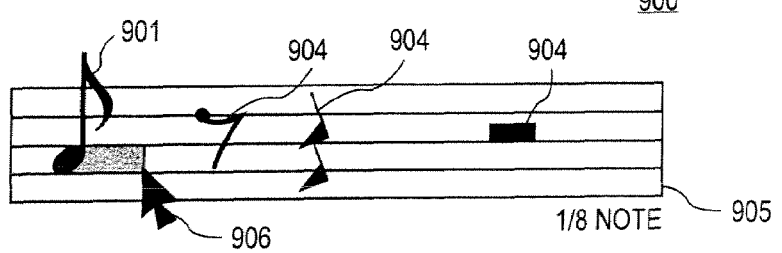

FIG. 9D illustrates the note 901 with the duration bar 902 adjusted to one eighth of the note. The appearance of the note 901 is modified to one eighth note to correspond to the adjusted duration bar 902, as shown in FIG. 9D. Rests 904 corresponding to a seven eighth note are respectively added to the staff 905, as shown in FIG. 9D. The sequence of FIGS. 9A-9D may be considered to represent a user input in which the user has dragged the duration indicator right to left to decrease the size of the indicator as the cursor moves right to left during the drag.

Figure 9E:
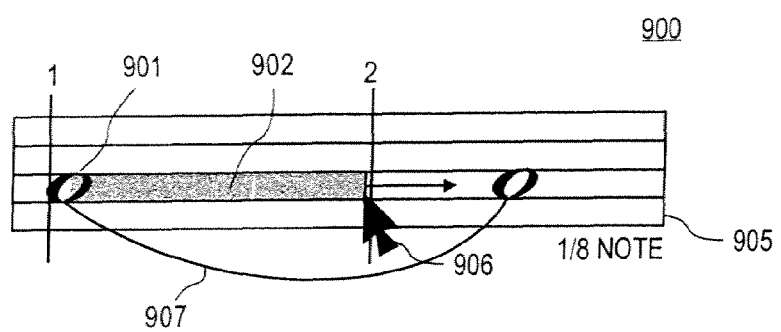

FIG. 9E illustrates the note 901, when the duration bar 902 is dragged beyond a measure 908 according to one embodiment of the invention. As shown in FIG. 9E, an arc 907 extending beyond the measure 908 is added to a head of the note 901, when the duration bar 902 is dragged by the cursor 906 beyond the measure 908.

Figure 10A:
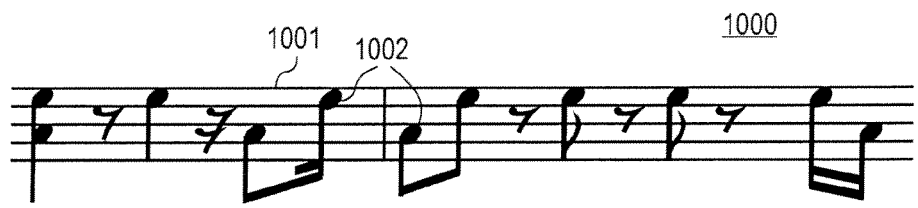

FIGS. 10A-10F illustrate a method to change duration of a pedal within a notation window according to another embodiment of the invention. The pedal sustains the sound of the note, extending duration of the note further. FIG. 10A illustrates a notation window 1000 having a staff 1001, notes 1002, and a pedal sign 1003 below the staff 1001. For one embodiment, the pedal sign 1003 is displayed as a ghosted pedal sign under a cursor 1004, as shown in FIG. 10A.

Figure 10B:
Figure 10C:
Figures 10D, 10E, 10F:
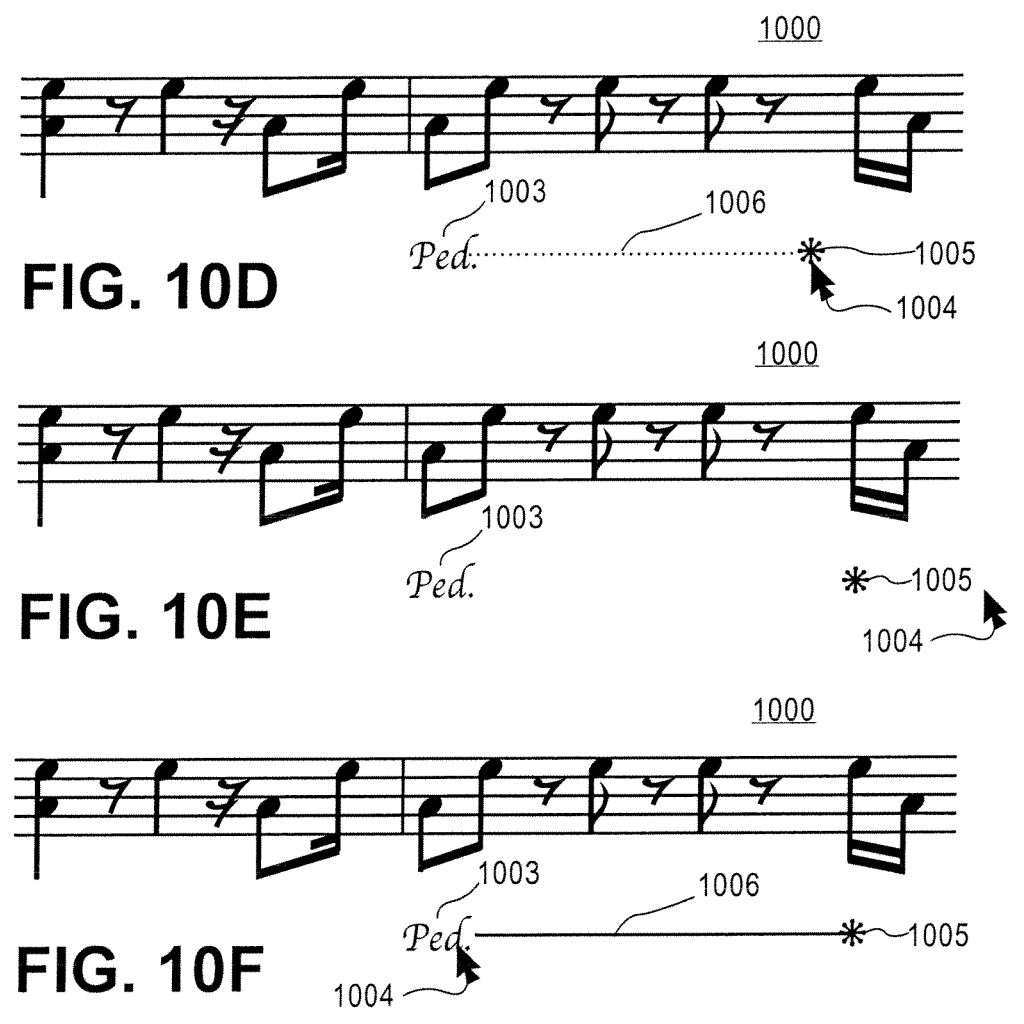

Next, the pedal sign 1003 is activated by clicking a mouse when the cursor 1004 is positioned over the pedal sign 1003, as shown in FIG. 10B. Next, the duration of the pedal is adjusted in a single GUI manipulation by dragging a cursor 1004 from the pedal sign 1003, as shown in FIG. 10C. As the cursor 1004 leaves the pedal sign 1003 and drags horizontally to the right from the pedal sign 1003 while the mouse is pressed, a star 1005 is displayed under the cursor 1004, as shown in FIG. 10C. The star 1005 is displayed as a ghosted sign, as shown in FIG. 10C. The star 1005 sets the end of the duration of the pedal, whereas the pedal sign 1003 sets the beginning of the pedal. A duration line 1006 may connect the star 1005 to the pedal sign 1003 while the cursor 1004 is dragged away from the pedal sign 1003 to change a duration of the pedal, as shown in FIGS. 10C and 10D. The duration line 1006 represents the duration of the pedal sign 1003 and appears as a gray dotted line, as shown in FIGS. 10C and 10D. The duration line 1006 has a beginning and an end, wherein the beginning is attached to the pedal sign 1003 and the end is attached to the star 1005, as shown in FIG. 10D.

FIG. 10E is a view similar to the FIG. 10D, after the mouse is released. As shown in FIG. 10E, the star 1005 turns black and the duration line 1006 disappears. Next, the pedal sign 1003 is selected by a click of the mouse, as shown in FIG. 10F. For an embodiment, after the duration of the pedal is set, appearances of the pedal sign 1003, the star 1005 and the duration line 1006 may be modified from the original appearances before setting the duration of the pedal. For example, the pedal sign 1003, the star 1005, and the duration line 1006 may be modified to have the same color, which is different from their original color, and the duration line 1006 may change to a solid line, as shown in FIG. 10F. As such, the length of the duration line 1006 represents the duration of the pedal sign 1003 and is adjustable by a single mouse click and drag, as shown in FIGS. 10C-10F.

Figure 11:
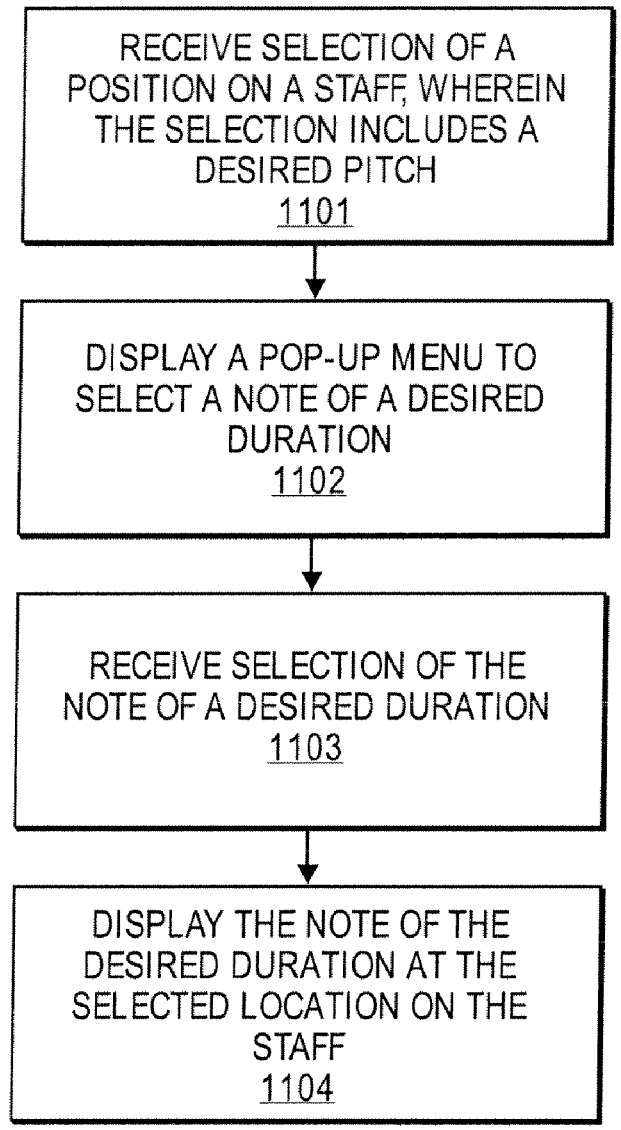
FIG. 11 is a flowchart of a method to change duration of a musical note according to yet another embodiment of the invention.

FIG. 11 is a flowchart of a method 1100 to change duration of a musical note within a notation window according to yet another embodiment of the invention. The method 1100 begins with receiving 1101 selection of a position on a staff, wherein the selection includes a desired pitch. The pitch is defined as a position on the staff, indicating how high or low the note sounds.

Figure 12A:
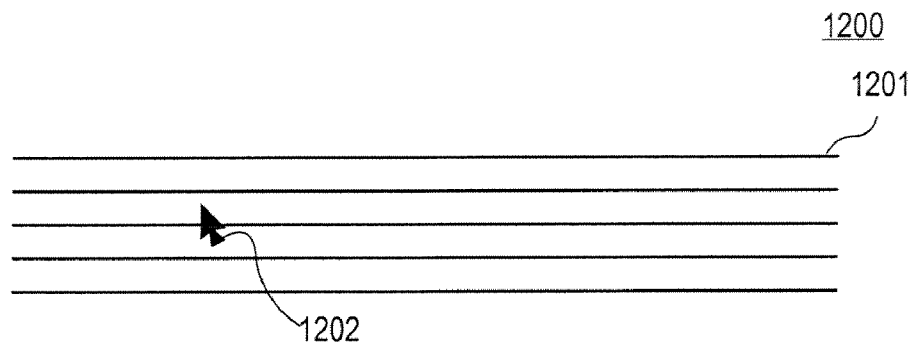
FIGS. 12A-12C illustrate changing a duration and a pitch of a note within a notation window according to yet another embodiment of the invention.

FIG. 12A illustrates selecting a position on a staff 1201 by positioning a cursor 1202 over a desired position on the staff 1201 and pressing a button (e.g. a mouse's button), according to one embodiment of the invention.

Figure 12B:
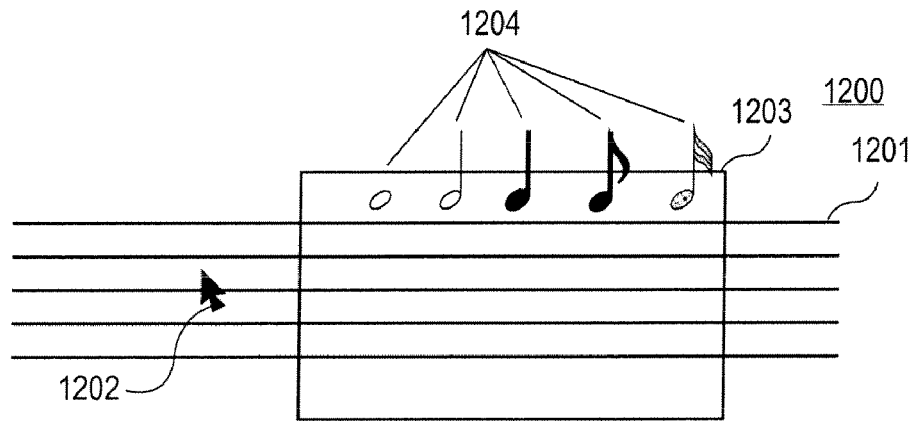

Referring back to FIG. 11, the method continues with the operation 1102 of displaying a pop-up menu at the selected position on the staff to select notes of various durations. For an embodiment, the pop-up menu may be displayed after pressing a single key on the keyboard, for example, by pressing a CONTROL key, or COMMAND key and another key or by pressing a key when the pitch position of the note is selected on the staff. For one embodiment, as shown in FIG. 12B, the pop-up menu 1203 displayed at or near the selected position on the staff 1201 is a palette having notes 1204 of various durations. For another embodiment, the pop-up menu to draw a note of a desired duration at a desired pitch may be invoked by positioning the cursor 1202 over the desired location and performing a CONTROL-click operation.

Referring back to FIG. 11, the method continues with the operation 1103 of receiving selection of the note of the desired duration. For one embodiment, the selection of the note may be performed by positioning a cursor over the note with a desired duration in the pop-up menu and pressing a button (e.g. pressing a button on a keyboard or on a mouse). Next, the displaying 1104 the note with the desired duration at the desired location at the staff is performed.

Figure 12C:
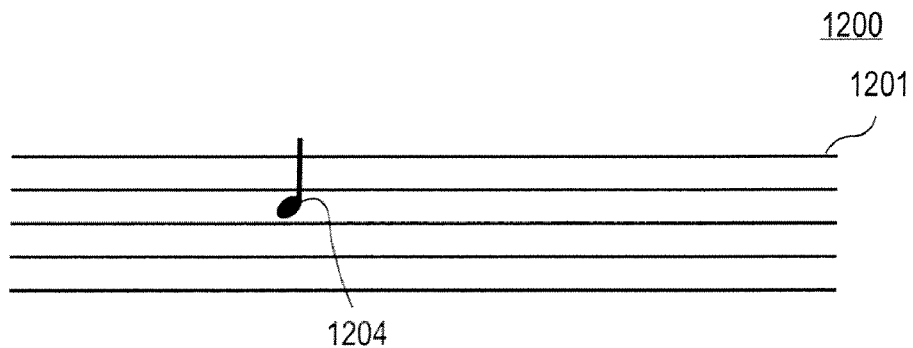

FIG. 12C illustrates displaying the note 1204 of the desired duration on the desired position on the staff 1201, wherein the desired position on the staff 1201 includes the desired pitch of the note 1204, according to one embodiment of the invention.

Referring back to FIG. 11, the method 1100 may be performed without using the pop-up menu according to yet another embodiment of the invention. The operation 1103 of selecting the note of the desired duration and the operation 1104 of displaying the note of the desired duration may be performed upon receiving a signal from a single key on a keyboard. For an embodiment, a single key on the keyboard may be a number key pressed by a user.

Figure 13A:
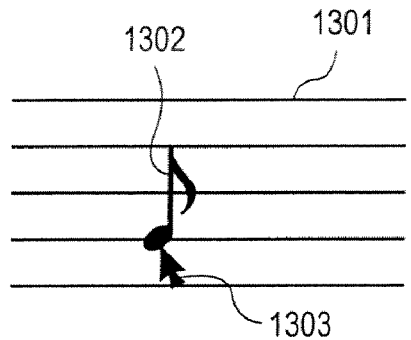
FIGS. 13A-13C illustrate a method to directly change velocity of a note within a notation window according to another embodiment of the invention.
Figure 13B:
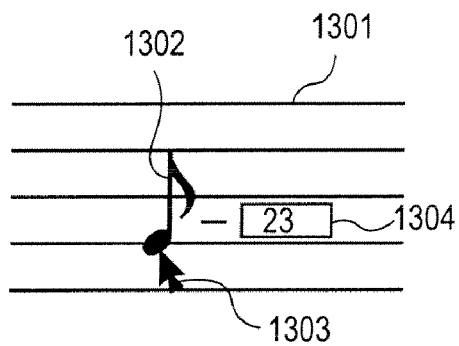
Figure 13C:
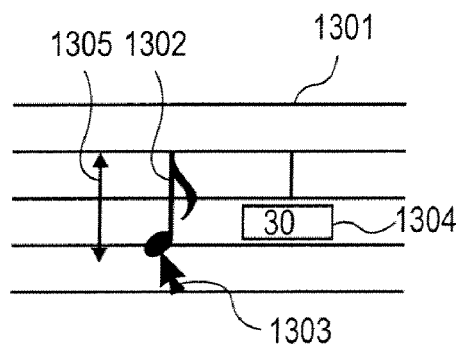

FIGS. 13A-13C illustrate a method to directly change velocity of a note (e.g. how hard a key on a piano is hit by a finger) within a notation window according to another embodiment of the invention. First, the selection of a note 1302 on a staff 1301 within a notation window 1300 is received, as illustrated in FIG. 13A. The velocity of the note 1302 indicates how fast the note 1302 is played. For an embodiment, the selection of the note 1302 may be performed by positioning a cursor 1303 over the note 1302 and pressing a mouse. Next, a velocity indicator ("velocity slider") 1304 of the note 1302 is displayed, as shown in FIG. 13B. For one embodiment, the velocity indicator 1304 is displayed next to a head of the note 1302 and has a number readout indicating the velocity of the note 1302, as shown in FIG. 13B. Further, a user manipulation of the note 1302 is received and the velocity of the note 1302 in the velocity indicator 1304 is updated to reflect new settings, as shown in FIG. 13C. For an embodiment, the velocity indicator 1304 is adjusted automatically as the note 1302 is dragged up or down in a vertical direction 1305, as shown in FIG. 13C, while a COMMAND key is pressed.

Figure 14:
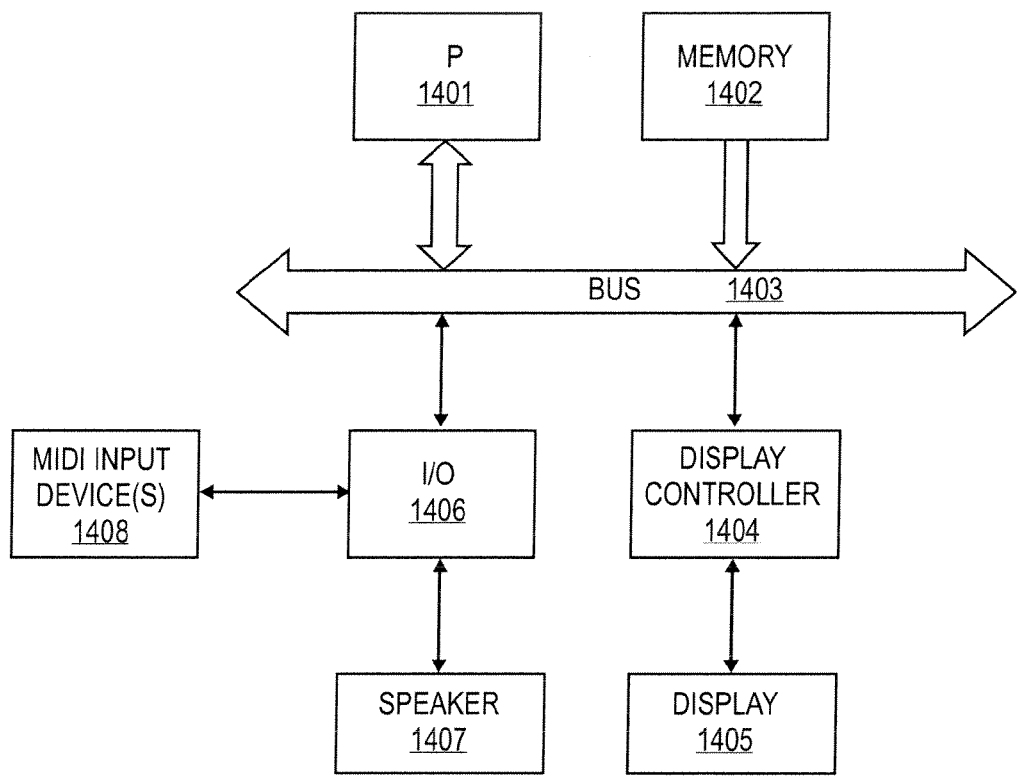
FIG. 14 is a block diagram of a system that performs methods of manipulating musical signs according to one embodiment of the invention.

FIG. 14 shows a block diagram of an exemplary data processing system 1400 that performs methods of manipulating musical signs described above with respect to FIGS. 1-13 and 15-16 according to one embodiment of the invention. The system may be a general purpose computer system or a special purpose data processing system. The system 1400 includes a microprocessor 1401 coupled to a bus 1403 and to a memory 1402. Software that includes programs and data to perform methods described above with respect to FIGS. 1-13 and 15-16 is written onto the memory 1402, which is coupled to the microprocessor 1401 using the bus 1403. For one embodiment, the memory 1402 may be a magnetic disk, an optical disk, a flash memory chip, a hard disk, a dynamic random access memory ("DRAM"), a battery backed memory, or any combination thereof. For one embodiment, the memory 1402 may include a portable disk, such as a CD-ROM, a DVD, or a floppy disk. The microprocessor 1401 executes the software written onto the memory 1402 to perform the methods of manipulating the musical signs within the notation window, as described above with respect to FIGS. 1-13 and 15-16. As shown in FIG. 14, the microprocessor 1401 and the memory 1402 are coupled through the bus 1403 to an input/output ("I/O") controller 1406 and to a display controller 1404. For one embodiment, the I/O controller 1406 is coupled to one or more devices 1408 having Musical Instrument Digital Interface ("MIDI") to provide music input from the user. For one embodiment, the I/O controller 1406 is coupled to one or more speakers 1407, as shown in FIG. 14. For one embodiment, as shown in FIG. 14, the display controller 1404 is coupled to a display 1405 to display, for example, a notation window, wherein the methods described above with respect to FIGS. 1-13 and 15-16, are performed.

Figure 15:
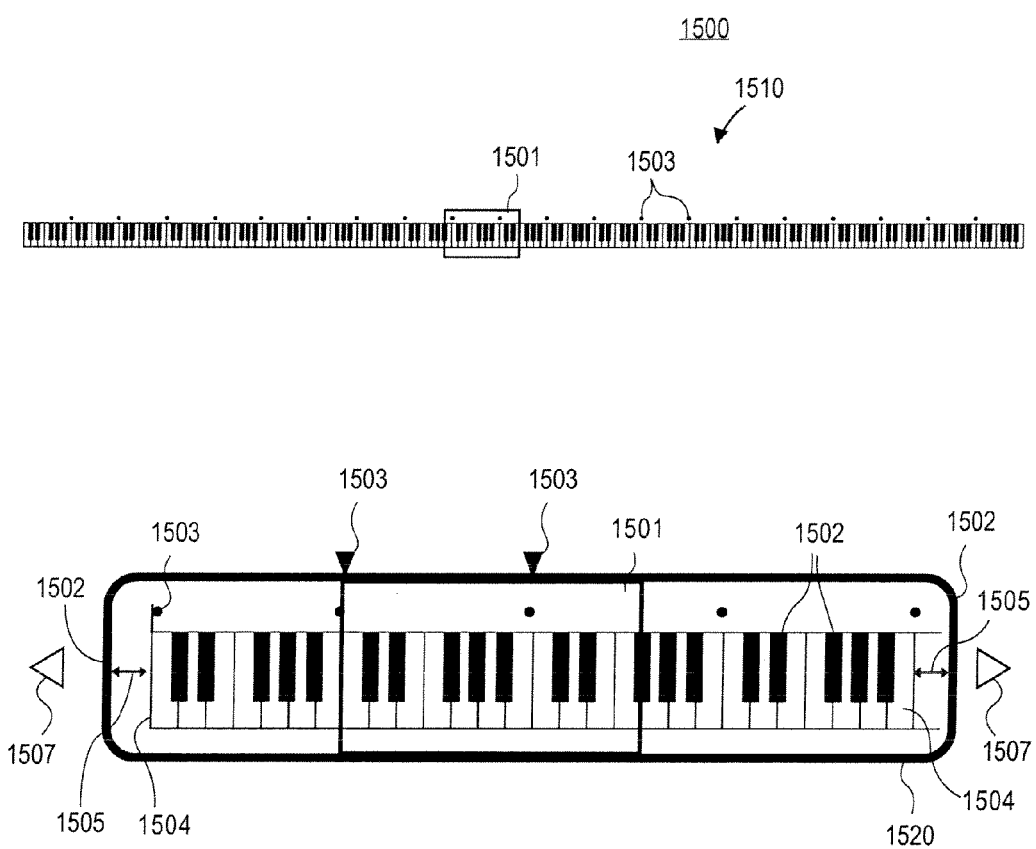
FIG. 15 illustrates an input of a musical instrument within a display window, wherein the input has an octave picker according to another embodiment of the invention.

FIG. 15 illustrates an input 1510 of a musical instrument within a display window 1500, wherein the input 1510 has an octave picker 1501 according to another embodiment of the invention. The octave picker 1501 is displayed over a portion of the input 1510 and may extend over one or more octaves, as shown in FIG. 15. Dots 1503 indicate octave divisions on the input 1510 of the musical instrument, as shown in FIG. 15. At least the portion of the input 1510 selected by the octave picker 1501 is displayed in an enlarged view 1520 below the input 1510 within the window 1500 and is visible to the user, as shown in FIG. 15. The input 1510 of the musical instrument appears as a bar above the enlarged view 1520 within the window 1500, as shown in FIG. 15. For one embodiment, the octave picker 1501 highlights the portion of the input 1510 to indicate, for example, the exact number of piano keys visible to the user. For one embodiment, the octave picker 1501 is extendable to increase the portion of the input 1510 visible by the user in the enlarged view 1520. The input 1510 may be a keyboard, an input of a string instrument, or an input of any musical instrument. As shown in FIG. 15, scroll arrows 1507 are displayed at sides 1502 in the enlarged view 1520 to scroll from the portion selected by the octave picker 1501 along the input 1510 in any direction to display various portions of the input 1510 in the enlarged view 1520. For one embodiment, in the enlarged view 1520 the distance 1505 between keys 1504 and the sides 1502 is about 4 pixels to provide sufficient visibility of the keys 1504.

Figure 16A:
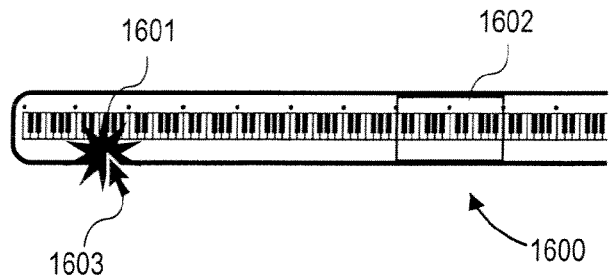
FIGS. 16A and 16B illustrate a method to select a portion of an input of a musical instrument using an octave picker according to one embodiment of the invention.
Figure 16B:
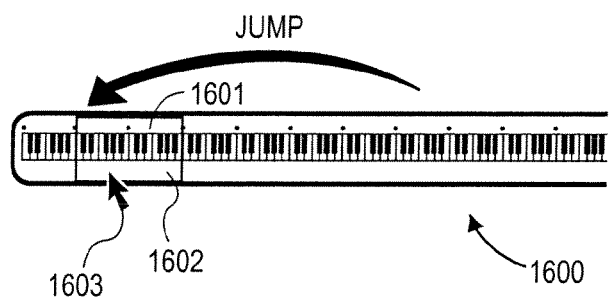

FIGS. 16A and 16B illustrate a method to select a portion of an input 1600 of a musical instrument using an octave picker according to one embodiment of the invention. First, the selection of a desired portion 1601 within the input 1600 is received, as illustrated in FIG. 16A. For an embodiment, the selection of the desired portion 1601 may be performed by positioning a cursor 1603 over the desired portion 1601 on the input 1600 and pressing a mouse. Next, in response to the selection of the desired portion 1601, the octave picker 1602 is moved directly to the desired portion 1601 on the input 1600. Further, the octave picker 1602 is displayed over the desired region 1601 within the input 1600. Further, the enlarged view 1520 of at least the desired region 1601 is displayed, as described above with respect to FIG. 15.

Figure 16C:
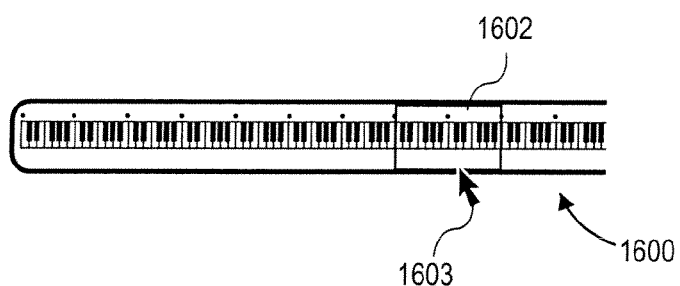
FIGS. 16C and 16D illustrate a method to select the portion of the input of the musical instrument using the octave picker according to another embodiment of the invention.
Figure 16D:
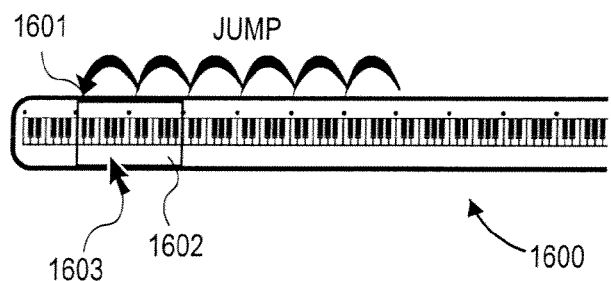

FIGS. 16C and 16D illustrate a method to select the portion of the input 1600 of the musical instrument using the octave picker according to another embodiment of the invention. First, the selection of the octave picker 1602 is received, as illustrated in FIG. 16C. For an embodiment, the selection of the octave picker 1602 may be performed by positioning a cursor 1603 over the octave picker 1602 on the input 1600 and pressing a mouse. Next, a user manipulation of the octave picker 1602, which moves the octave picker 1602 to a desired portion 1601 is received. For one embodiment, the user manipulation is performed by dragging the octave picker 1602 with the cursor 1603. Further, the octave picker 1602 is displayed as "jumping" over the respective portions on the input 1600 in response to the user manipulation. For one embodiment, the respective portions on the input 1600 extend to one or more respective octaves. Next, after the user manipulation of the octave picker 1602 is completed, the octave picker 1602 is displayed over the desired portion 1601 within the input 1600. Further, the enlarged view 1520 of at least the desired region 1601 is displayed, as described above with respect to FIG. 15.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method of selecting a portion of an input of a musical instrument within a display window, comprising:
   displaying an octave picker in front of the input of the musical instrument, wherein the octave picker selects a desired portion on the input;
   moving the octave picker to select the desired portion on the input by placing the octave picker in front of the desired portion; and
   displaying an enlarged view of at least the desired portion of the input in response to the place the octave picker.

2. The method of claim 1, further comprising:
   receiving a selection of a desired portion on the input before the moving.

3. The method of claim 1, further comprising:
   receiving a selection of the octave picker before moving, and
   receiving a user manipulation of the octave picker.

4. The method of claim 1, further comprising:
   displaying the octave picker over the desired portion on the input.

5. The system of claim 1, further comprising:
   means for receiving a selection of a desired portion on the input before the moving.

6. The system of claim 1, further comprising:
   means for receiving a selection of the octave picker before moving, and
   means for receiving a user manipulation of the octave picker.

7. The system of claim 1, further comprising:
   means for displaying the octave picker over the desired portion on the input.

8. An article of manufacture comprising:
   machine-accessible medium including data that, when accessed by a machine, cause the machine to perform operations comprising,
   displaying an octave picker in front of the input of the musical instrument, wherein the octave picker selects a desired portion on the input;
   moving the octave picker to select the desired portion on the input by placing the octave picker in front of the desired portion; and
   displaying an enlarged view of at least the desired portion of the input in response to the place the octave picker.

9. The article of manufacture of claim 8, wherein the machine-accessible medium further includes data, when accessed, results in the machine performing operations comprising, receiving a selection of a desired portion on the input before the moving.

10. The article of manufacture of claim 8, wherein the machine-accessible medium further includes data, when accessed, results in the machine performing operations comprising, receiving a selection of the octave picker before moving, and
    receiving a user manipulation of the octave picker.

11. The article of manufacture of claim 8, wherein the machine-accessible medium further includes data, when accessed, results in the machine performing operations comprising, displaying the octave picker over the desired portion on the input.

12. A system, comprising:

means for displaying an octave picker in front of the input of the musical instrument, wherein the octave picker selects a desired portion on the input;

means for moving the octave picker to select the desired portion on the input by placing the octave picker in front of the desired portion; and means for displaying an enlarged view of at least the desired portion of the input in response to the placing the octave picker.

* * * * *